United States Patent
Dagrossa

(10) Patent No.: US 9,937,884 B2
(45) Date of Patent: Apr. 10, 2018

(54) ADJUSTABLE LENGTH BUMPER GUARD

(71) Applicant: Darrin Dagrossa, Douglaston, NY (US)

(72) Inventor: Darrin Dagrossa, Douglaston, NY (US)

(*) Notice: Subject to any disclaimer, the term of this patent is extended or adjusted under 35 U.S.C. 154(b) by 0 days.

(21) Appl. No.: 15/175,916

(22) Filed: Jun. 7, 2016

(65) Prior Publication Data
US 2017/0349125 A1    Dec. 7, 2017

(51) Int. Cl.
*B60R 19/44* (2006.01)
*B60R 19/02* (2006.01)

(52) U.S. Cl.
CPC ............ *B60R 19/44* (2013.01); *B60R 19/023* (2013.01)

(58) Field of Classification Search
CPC .............................. B60R 19/44; B60R 19/023
See application file for complete search history.

(56) References Cited

U.S. PATENT DOCUMENTS

| | | | |
|---|---|---|---|
| 2,271,046 A | 1/1942 | Sing | |
| 3,178,204 A | 4/1965 | Croft | |
| 4,726,614 A | 2/1988 | Myers et al. | |
| 5,618,073 A | 4/1997 | Criscione | |
| 7,073,830 B1 | 7/2006 | Chen et al. | |
| 7,740,294 B2* | 6/2010 | Malina | B60R 19/44 293/128 |
| D619,060 S | 7/2010 | Lorenzo | |
| D619,061 S | 7/2010 | Lorenzo | |
| 9,358,942 B1 | 6/2016 | Tekavec | |
| 9,505,363 B2* | 11/2016 | Judd | B60R 19/44 |
| 2003/0034660 A1 | 2/2003 | Kelly | |
| 2005/0242558 A1 | 11/2005 | Cohen | |
| 2008/0116703 A1 | 5/2008 | Malina et al. | |
| 2011/0198874 A1 | 8/2011 | Lee et al. | |
| 2015/0307046 A1 | 10/2015 | Fritsch | |

* cited by examiner

*Primary Examiner* — D Glenn Dayoan
*Assistant Examiner* — Melissa A Black
(74) *Attorney, Agent, or Firm* — Richard L. Miller

(57) ABSTRACT

A length-adjustable protector that overlies, and protects, either a front or a rear bumper cover of a vehicle, and self-adjusts to the length of either the front or the rear bumper cover. The protector includes an inner, an outer, and a pair of intermediate layers. The inner layer faces, and overlies, a central portion of the length of either the front or the rear bumper cover. The outer layer overlies the inner layer. The pair of intermediate layers extend movably between the inner and outer layers, face, and overlie, remaining end portions of the length of either the front or the rear bumper covers, and in doing so, self-adjusts to the length of either the front or the rear bumper covers.

82 Claims, 5 Drawing Sheets

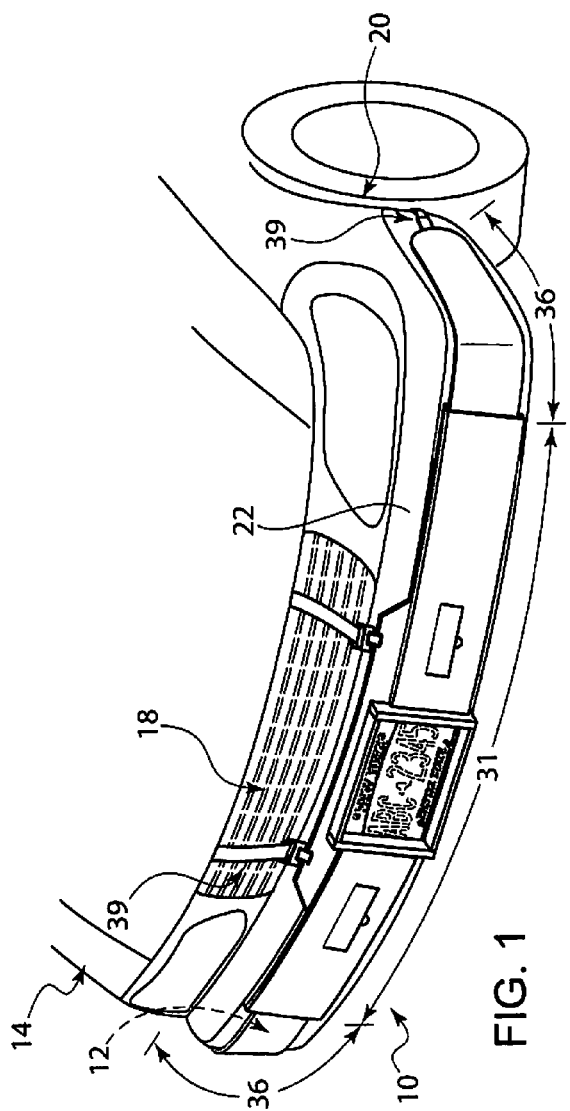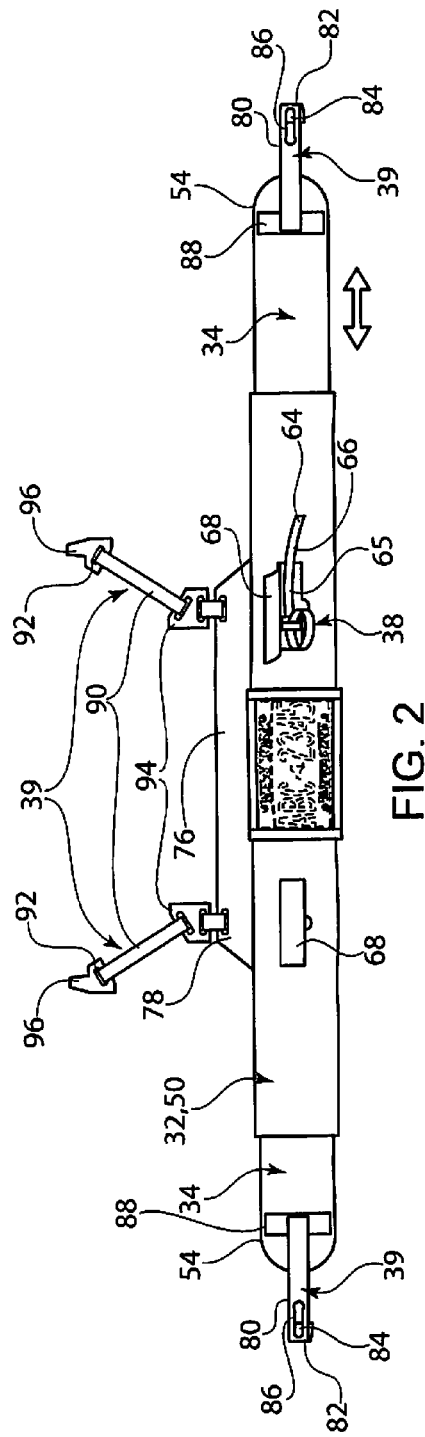

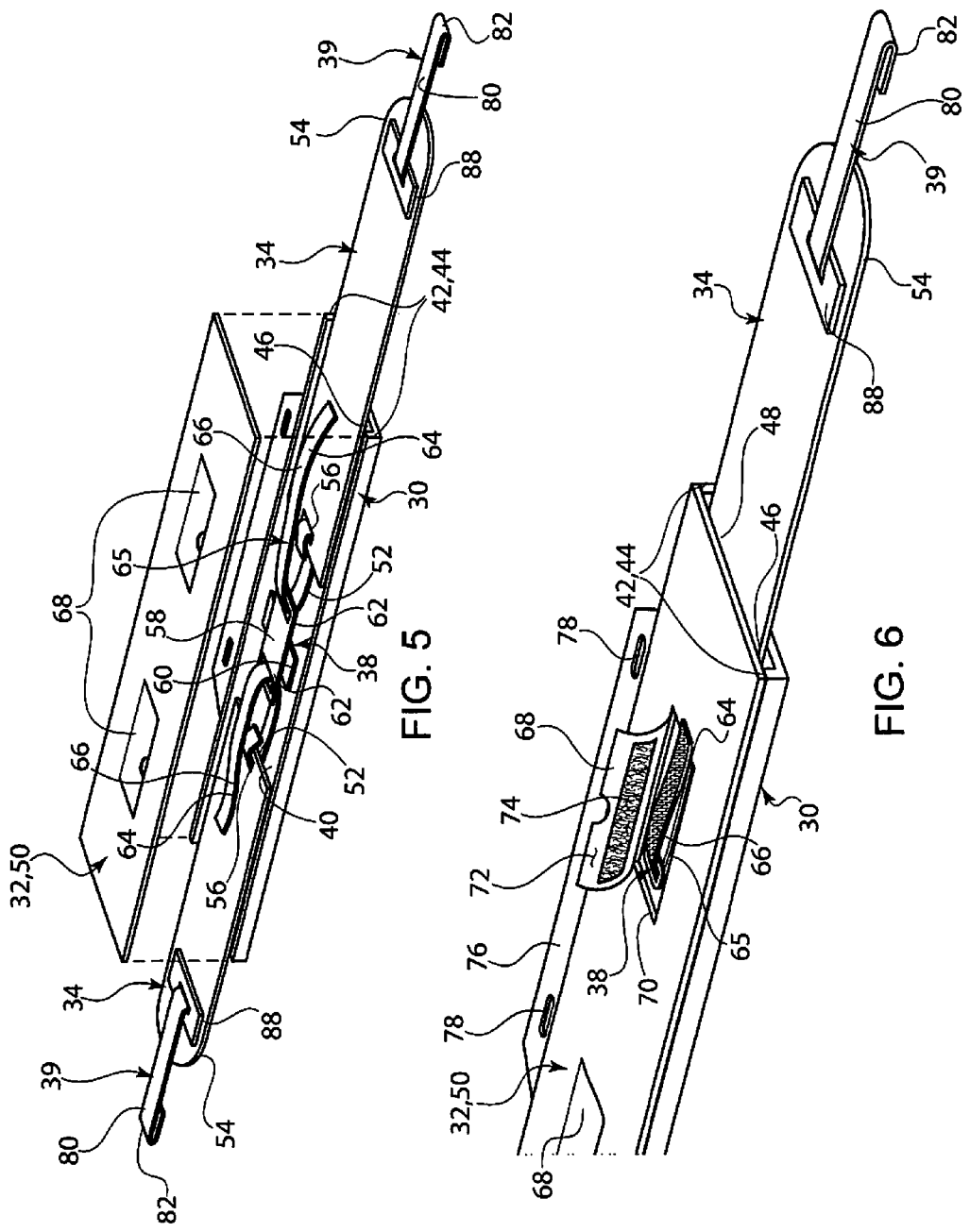

ADJUSTABLE LENGTH BUMPER GUARD

BACKGROUND OF THE INVENTION

Field of the Invention

The present invention relates to a bumper guard, and more particularly, an adjustable length bumper guard.

Description of the Prior Art

Numerous innovations for bumper cover protectors have been provided in the prior art that will be described. Even though these innovations may be suitable for the specific individual purposes to which they address, however, they differ from the present invention.

A FIRST EXAMPLE, U.S. Pat. No. 2,271,046, Published/Issued on Jan. 27, 1942, to Sing teaches a bumper guard formed of resilient material and adapted to extend transversely across the face of a bumper. The guard includes flexible end portions adapted to overhang the respective upper and lower edges of the bumper, and tension apparatus for drawing the flexible end portions together to tightly hold the bumper guard upon the bumper. The flexible end portions have transverse journals for receiving the tension apparatus. The tension apparatus includes oppositely arranged threaded shank portions journalled within the journals, and a turnbuckle engaging the shank portions for drawing the same together. The shank portions are scored transversely adjacent their ends to provide portions to be broken off to decrease the length thereof without interfering with the threaded portions.

A SECOND EXAMPLE, U.S. Pat. No. 3,178,204, Published/Issued on Apr. 13, 1965, to Croft teaches detachable trailer hitch bumper clamps adapted to be universally installable on automotive rear bumpers of widely variant contours.

A THIRD EXAMPLE, U.S. Pat. No. 4,726,614, Published/Issued on Feb. 23, 1988, to Myers, et al. teaches a vehicle body panel protector bumper including semi-flexible tubular members having base sides with magnets for mounting in a selected position on a body panel, with a lengthwise adjustable security tab for attachment to a door edge, and connected by a flexible hinge-connector strap for convenient mounting, dismounting, and storage.

A FOURTH EXAMPLE, U.S. Pat. No. 5,618,073, Published/Issued on Apr. 8, 1997, to Criscione teaches a protective cover for covering the outer surface of a rear bumper of a motor vehicle. The protective cover includes a single panel of flexible material or alternatively two panels of flexible material and a central portion formed from a transparent polymer that provides visual access to a rear license plate that may be located in a recess formed in the rear bumper. The protective cover is secured in place across the rear bumper by straps that are looped through attachment handles affixed to the motor vehicle's rear wheel.

A FIFTH EXAMPLE, U.S. Pat. No. 7,073,830, Published/Issued on Jul. 11, 2006, to Chen, et al. teaches a bumper protection device for automobile bumpers to shield the bumpers from impact, which attaches to the automobile by a fabric shroud that attaches around the hood and trunk latch and suspends an impact-resisting padded-guard portion, adapted to the vehicle bumper, and covering the entire front or rear bumper. The padded guard portion is drawn partially around the sides of the bumper and anchored by at least one elastic strap attached to opposing ends of the bumper guard portion. Each elastic strap is further attached to the tires or wheel wells of the automobile retaining the bumper protection device over the entire rear bumper surface and around the sides of the bumper.

A SIXTH EXAMPLE, U.S. Pat. No. D619,060, Published/Issued on Jul. 6, 2010, to Lorenzo teaches an ornamental design for an adjustable automobile bumper protector.

A SEVENTH EXAMPLE, U.S. Patent Office Document No. 2003/0034660, Published/Issued on Feb. 20, 2003, to Kelly teaches a portable cushion protector that is attachable to, and detachable from, the rear portions of an automobile, and which protects its rear bumper from scratches and other damage while it is parked. The cushion protector has supporting mechanisms that are attached to the automobile trunk for holding the cushion in place upon the bumper.

AN EIGHTH EXAMPLE, U.S. Patent Office Document No. 2005/0242558, Published/Issued on Nov. 3, 2005, to Cohen teaches a protective mat made from a variety of materials ranging from cloth to leather. Once it is attached in place in the trunk or rear cargo area of a vehicle, the unattached end can be grasped, pulled out of the vehicle's trunk/cargo space, and dropped down over the bumper. The made serves two functions: protects the rear bumper from being nicked, scratched, or dinged as articles, such as, golf bags and golf clubs, are dropped or rubbed across the bumper as they are being placed into and out of the vehicle's trunk or cargo space area; and functions as a clean surface on which a person may sit when performing any function requiring a seated position such as changing from street shoes to golf shoes.

A NINTH EXAMPLE, U.S. Patent Office Document No. 2011/0198874, Published/Issued on Aug. 18, 2011, to Lee, et al. teaches a removable, padded, and vinyl panel to be fastened over the rear bumper of a vehicle. The intent of which is to protect the bumper from scratches, dents, and dings. Manufactured by the Motor Vehicle Parts and Accessories industry, Standard Industrial Code 3714, the bumper protector is produced in a tough, durable, UV-resistant, and vinyl material, with an interior lining of impact-absorbing cellular synthetic foam. While the bumper protector is manufactured in a wide variety of lengths and widths, depending on the model of car, pickup, van, or SUV being fitted, the basic model is tapered, incorporating two side panels approximately three and one half feet in length and approximately five and one half inches in width, which extend to cover the sides of the bumper; and a longer, wider, approximately five and one half feet by approximately nine inch panel which covers the rear of the bumper. The bumper cover is equipped with a double-stitched flange, lip, or apron designed to slip under the vehicle's trunk-lid, which is closed in order to secure the bumper cover, and the side guard sections of the bumper cover fasten by way of VELCRO®-equipped straps.

It is apparent now that numerous innovations for bumper cover protectors have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an adjustable length bumper guard that avoids the disadvantages of the prior art.

ANOTHER OBJECT of the present invention is to provide an adjustable length bumper guard that is simple and inexpensive to manufacture.

STILL ANOTHER OBJECT of the present invention is to provide an adjustable length bumper guard that is simple to use.

BRIEFLY STATED, STILL YET ANOTHER OBJECT of the present invention is to provide a length-adjustable protector that overlies, and protects, one of a front bumper cover of a vehicle having a length and a rear bumper cover of the vehicle having a length, and self-adjusts to the length of the one of the front bumper cover of the vehicle and the rear bumper cover of the vehicle. The vehicle further has a grille, a pair of front wheel wells, a front bumper cover top, a trunk with a carpet and a pair of side walls, a pair of rear wheel wheels, and a rear bumper cover top. The length-adjustable protector includes an inner layer, an outer layer, and a pair of intermediate layers. The inner layer faces, and overlies, a central portion of the length of the one of the front bumper cover of the vehicle and the rear bumper cover of the vehicle. The outer layer overlies the inner layer. The pair of intermediate layers extend movably between the inner layer and the outer layer, and face, and overlie, remaining end portions of the length of the one of the front bumper cover of the vehicle and the rear bumper cover of the vehicle, and in doing so, self-adjusts to the length of the one of the front bumper cover of the vehicle and the rear bumper cover of the vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view illustrating an embodiment of the adjustable length bumper guard installed on the front end of an automotive vehicle;

FIG. 2 is a front plan view of the adjustable length bumper guard per se;

FIG. 5 is an exploded diagrammatic view of the adjustable length bumper guard exposing the VELCRO® (hook and loop pile fasteners) straps length adjustment mechanism;

FIG. 6 is an enlarged assembled diagrammatic view, with parts broken away, showing further cooperation between hook and loop pile fastener straps of the length adjustment mechanism;

A MARSHALING OF REFERENCE NUMERALS UTILIZED IN THE DRAWING

Figure 3:
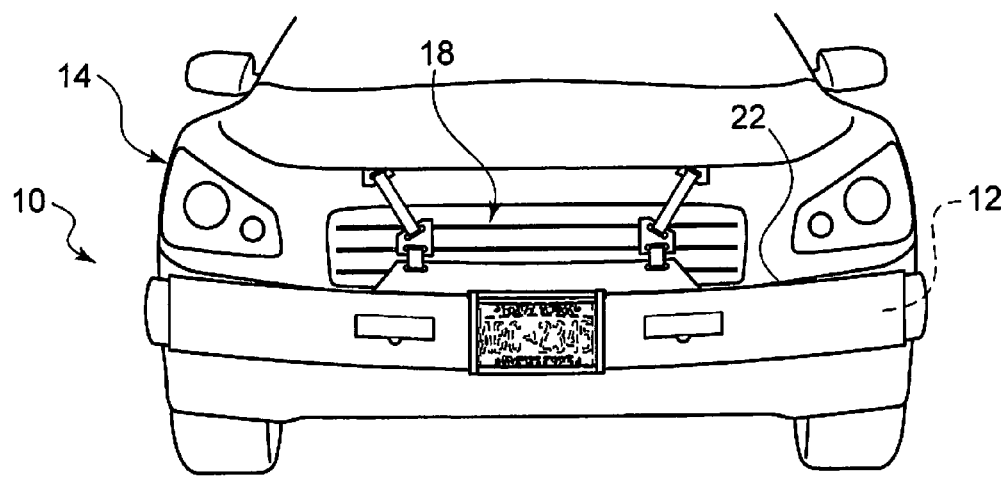
FIG. 3 is a front end view of an automotive vehicle with an embodiment of the adjustable length bumper guard installed thereon.
Figure 4:
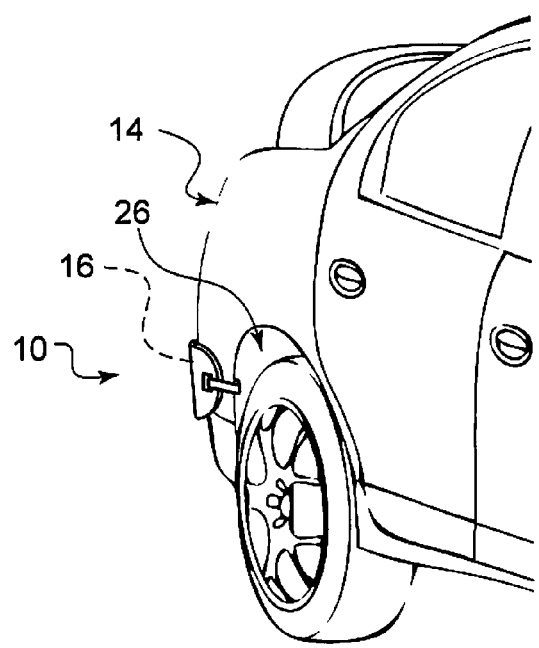
FIG. 4 is a view of the rear end of an automotive vehicle showing an end portion of the adjustable length bumper guard secured into the wheel well of an automotive vehicle.
Figure 7:
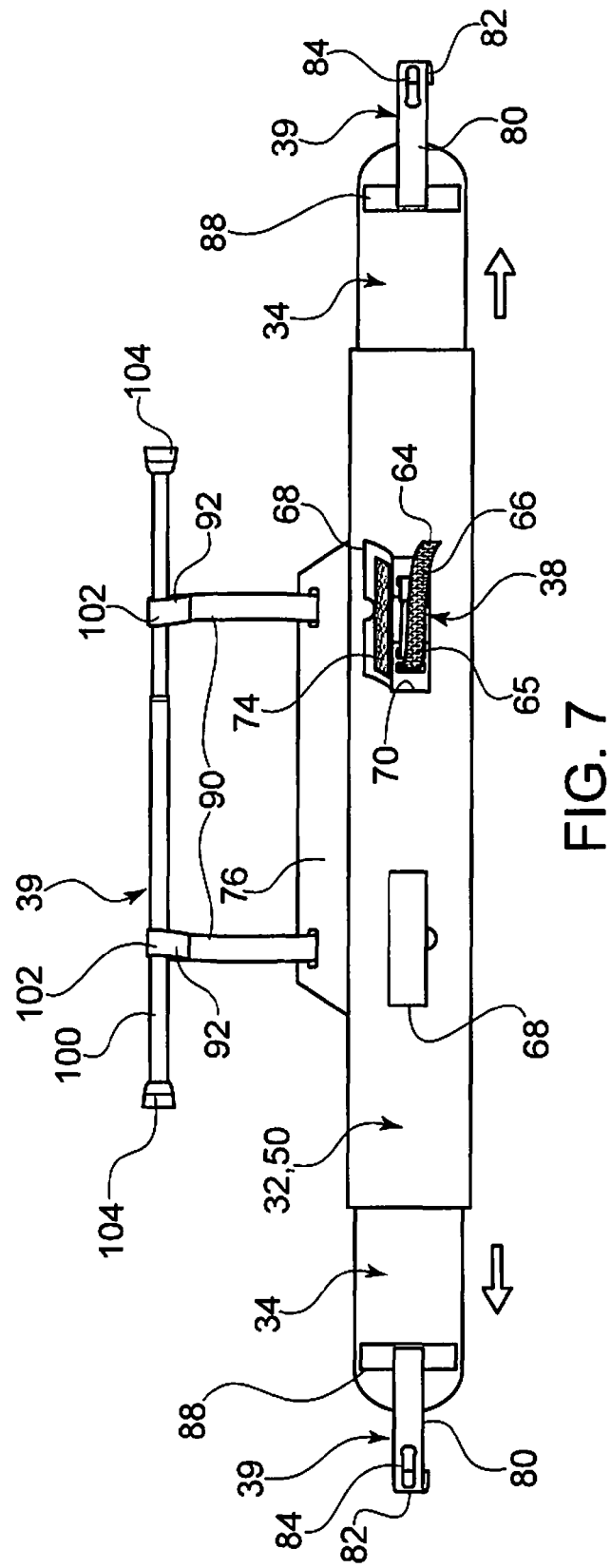
FIG. 7 a diagrammatic front plan view of the adjustable length bumper guard per se, which includes straps secured around an expansion securement rod.
Figure 8:
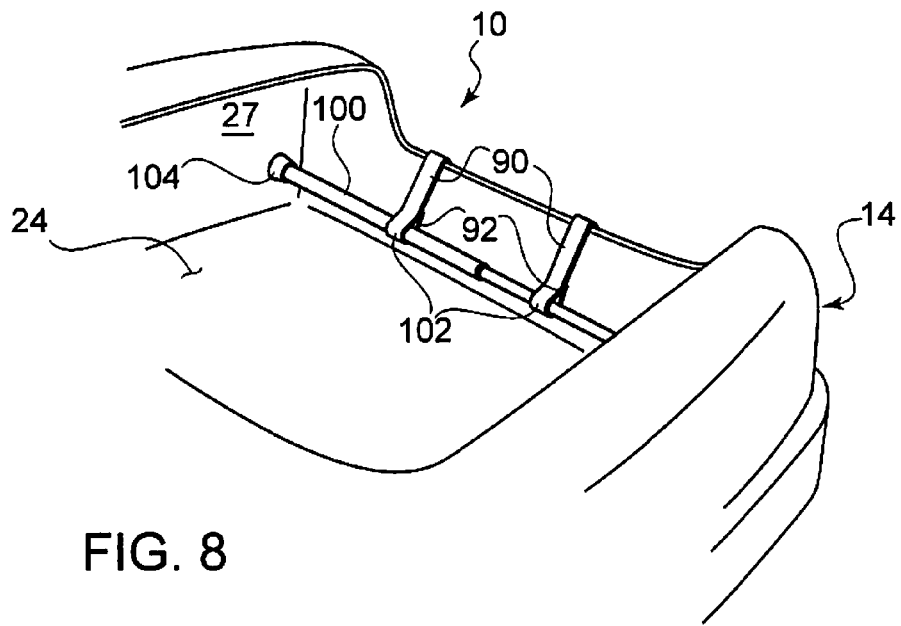
FIG. 8 illustrates the expansion rod expanded and installed inside of the trunk compartment of an automotive vehicle with securement straps flowing over the edge of the trunk and attaching to the, not visible in this Figure, adjustable length bumper guard.

Introductory 10 length-adjustable protector of embodiments of present invention for overlying, and protecting, one of front bumper cover 12 of vehicle 14 having a length and rear bumper cover 16 of vehicle 14 having a length, and for self-adjusting to length of one of front bumper cover 12 of vehicle 14 and rear bumper cover 16 of vehicle 14
12 front bumper cover of vehicle 14
14 vehicle
16 rear bumper cover of vehicle 14
18 grille of vehicle 14
20 pair of front wheel wells of vehicle 14
22 front bumper cover top of front bumper cover 12 of vehicle 14
24 trunk of vehicle 14
25 carpet of trunk 24 of vehicle 14
26 pair of rear wheel wheels of vehicle 14
27 pair of side walls of trunk 24 of vehicle 14
28 rear bumper cover top of rear bumper cover 16 of vehicle 14

Overall Configuration of Length-Adjustable Protector 10

30 inner layer for facing, and overlying, central portion 31 of length of one of front bumper cover 12 of vehicle 14 and rear bumper cover 16 of vehicle 14
31 central portion of one of front bumper cover 12 of vehicle 14 and rear bumper cover 16 of vehicle 14
32 outer layer
34 pair of intermediate layers for facing, and overlying, remaining end portions 36 of length of one of front bumper cover 12 of vehicle 14 and rear bumper cover 16 of vehicle 14
36 remaining end portions of one of front bumper cover 12 of vehicle 14 and rear bumper cover 16 of vehicle 14
38 maintaining apparatus
39 attaching apparatus for replaceably attaching length-adjustable protector 10 to vehicle 14

Specific Configuration of Inner Layer 30

40 outer-facing surface of inner layer 30
42 pair of longitudinal borders of outer-facing surface 40 of inner layer 30
44 pair of raised borders of pair of longitudinal borders 42 of outer-facing surface 40 of inner layer 30, respectively
46 track of outer-facing surface 40 of inner layer 30
48 pair of open ends of track 46 of outer-facing surface 40 of inner layer 30

Specific Configuration of Outer Layer 32

50 size and shape of outer layer 32

Specific Configuration of Pair of Intermediate Layers 34

52 inner proximal end of each intermediate layer of pair of intermediate layers 34
54 outer distal end of each intermediate layer of pair of intermediate layers 34 for preventing damage therefrom to remaining end portions 36 of length of one of front bumper cover 12 of vehicle 14 and rear bumper cover 16 of vehicle 14

Specific Configuration of Maintaining Apparatus 38

56 through slot of outer distal end 54 of each intermediate layer of pair of intermediate layers 34
58 belt-loop plate of maintaining apparatus 38
60 elevation plate of maintaining apparatus 38
62 pair of through slots of belt-loop plate 58 of maintaining apparatus 38
64 pair of straps of maintaining apparatus 38
65 one portion of hook and loop pile fasteners (VELCRO®) of maintaining apparatus 38
66 terminal portion of each strap of pair of straps 64 of maintaining apparatus 38
68 pair of access flaps of outer layer 32
70 pair of through openings of outer layer 32
72 inner surface of each access flap of pair of access flaps 68 of outer layer 32
74 pair of mating portions of hook and loop pile fasteners (VELCRO®) of maintaining apparatus 38

Specific Configuration of Attaching Apparatus 39

76 extended folding flap of attaching apparatus 39 for overlying one of front bumper cover top 22 of front bumper cover 12 of vehicle 14 and rear bumper cover top 28 of rear bumper cover 16 of vehicle 14
78 pair of through slots of extended folding flap 76 of attaching apparatus 39
80 pair of bendable, rubber-coated, and metallic strips of attaching apparatus 39 for bending into one of pair of front wheel wells 20 of vehicle 14, respectively, and pair of rear wheel wells 26 of vehicle 14, respectively
82 pair of terminal ends of pair of bendable, rubber-coated, and metallic strips 80 of attaching apparatus 39, respectively
84 pair of through bores of pair of terminal ends 82 of pair of bendable, rubber-coated, and metallic strips 80 of attaching apparatus 39, respectively
86 pair of screws of attaching apparatus 39 for screwing into one of pair of front wheel wells 20 of vehicle 14, respectively, and pair of rear wheel wells 26 of vehicle 14, respectively, when necessary
88 pair of supports of attaching apparatus 39
90 pair of straps of attaching apparatus 39
92 pair of terminal portions of pair of straps 90 of attaching apparatus 39, respectively.
94 pair of angled belt loops of attaching apparatus 39
96 pair of flat hooks of attaching apparatus 39 for replaceably engaging grille 18 of vehicle 14
98 one portion of hook and loop pile fasteners of attaching apparatus 39 for replaceably engaging carpet 25 of trunk 24 of vehicle 14
100 tension rod of attaching apparatus 39 when protector 10 is for protecting rear bumper cover 16 of vehicle 14
102 pair of loops of pair of terminal portions 92 of pair of straps 90 of attaching apparatus 39, respectively
104 pair of ends of tension rod 100 of attaching apparatus 39 for snugging up against pair of side walls 27 of trunk 24 of vehicle 14, respectively

DETAILED DESCRIPTION OF THE PREFERRED EMBODIMENT

Introductory

Referring now to the figures, in which like numerals indicate like parts, and particularly to FIGS. 1, 3, 4, 8, and 9, the length-adjustable protector of the embodiments of the present invention is shown generally at 10 for overlying, and protecting, one of a front bumper cover 12 of a vehicle 14 having a length and a rear bumper cover 16 of the vehicle 14 having a length, and for self-adjusting to the length of the one of the front bumper cover 12 of the vehicle 14 and the rear bumper cover 16 of the vehicle 14, wherein the vehicle 14 further has a grille 18, a pair of front wheel wells 20, a front bumper cover top 22, a trunk 24 with a carpet 25 and a pair of side walls 27, a pair of rear wheel wheels 26, and a rear bumper cover top 28.

Overall Configuration of the Length-Adjustable Protector 10

The overall configuration of the length-adjustable protector 10 can best be seen in FIGS. 2, 5, 6, and 7, and as such, will be discussed with reference thereto.

Figure 9:
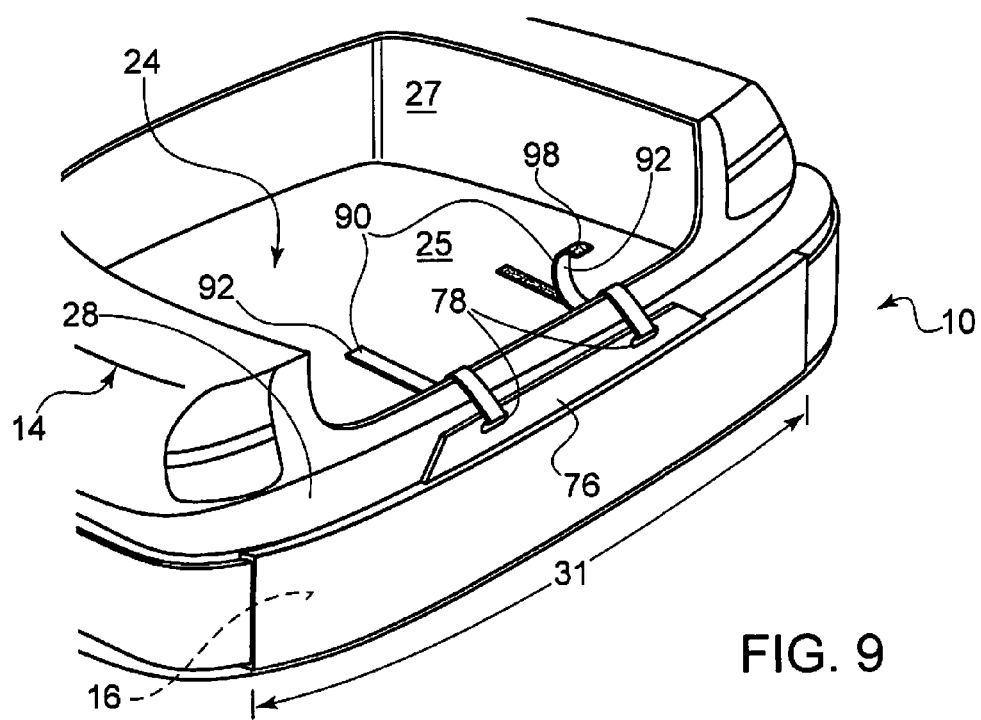
FIG. 9 illustrates the adjustable length bumper guard installed on the rear end of an automotive vehicle with securement straps flowing over the edge of the trunk and attaching to the, not visible in this Figure, expansion rod expanded and installed inside of the trunk compartment of an automotive vehicle.

The length-adjustable protector 10 comprises an inner layer 30, an outer layer 32, and a pair of intermediate layers 34. The inner layer 30 is for facing, and overlying, a central portion 31 of the length of the one of the front bumper cover 12 of the vehicle 14 (FIG. 1) and the rear bumper cover 16 of the vehicle 14 (FIG. 9). The outer layer 32 overlies the inner layer 30. The pair of intermediate layers 34 extend movably between the inner layer 30 and the outer layer 32, and are for facing, and overlying, remaining end portions 36 of the length of the one of the front bumper cover 12 of the vehicle 14 (FIG. 1) and the rear bumper cover 16 of the vehicle 14 (FIG. 9).

The length-adjustable protector 10 further comprises maintaining apparatus 38.

The maintaining apparatus 38 maintains the pair of intermediate layers 34 at desired positions for facing, and overlying, the remaining end portions 36 of the length of the one of the front bumper cover 12 of the vehicle 14 and the rear bumper cover 16 of the vehicle 14.

The length-adjustable protector 10 further comprises attaching apparatus 39 for replaceably attaching the length-adjustable protector 10 to the vehicle 14.

Specific Configuration of the Inner Layer 30

The specific configuration of the inner layer 30 can best be seen in FIGS. 5 and 6, and as such, will be discussed with reference thereto.

The inner layer 30 is rectangular-shaped, made from rubber, and has an outer-facing surface 40 with a pair of longitudinal borders 42.

The pair of longitudinal borders 42 of the inner layer 30 are a pair of raised borders 44, respectively, so as to form a track 46 therebetween having a pair of open ends 48.

Specific Configuration of the Outer Layer 32

The specific configuration of the outer layer 32 can best be seen in FIGS. 2 and 5-7, and as such, will be discussed with reference thereto.

The outer layer 32 is rectangular-shaped, made from rubber, has a size and shape 40 that is similar to that of the inner layer 30, and overlies, and contacts, the pair of raised borders 44 of the pair of longitudinal borders 42 of the inner layer 30, and in doing so, completes the track 46 of the inner layer 30.

Specific Configuration of the Pair of Intermediate Layers 34

The specific configuration of the pair of intermediate layers 34 can best be seen in FIGS. 2 and 5-7, and as such, will be discussed with reference thereto.

The pair of intermediate layers 34 extend from, and retract into, the track 46 of the inner layer 30, via the pair of open ends 48 of the track 46 of the inner layer 30, respectively.

Each intermediate layer 34 is flat, made from rubber, and has an inner proximal end 52 and an outer distal end 54.

The outer distal end 54 of each intermediate layer 34 is arcuately-convex-shaped to eliminate sharp edges thereat for preventing damage therefrom to the remaining end portions 36 of the length of the one of the front bumper cover 12 of the vehicle 14 and the rear bumper cover 16 of the vehicle 14.

Specific Configuration of the Maintaining Apparatus 38

The specific configuration of the maintaining apparatus 38 can best be seen in FIGS. 2 and 5-7, and as such, will be discussed with reference thereto.

The maintaining apparatus 38 includes the inner proximal end 52 of each intermediate layer 34 having a through slot 56.

The maintaining apparatus 38 further includes a belt-loop plate 58.

The belt-loop plate 58 of the maintaining apparatus 38 is attached to the outer-facing surface 40 of the inner layer 30, via an elevation plate 60, and is disposed centrally thereat.

The belt-loop plate 58 of the maintaining apparatus 38 and the elevation plate 60 of the maintaining apparatus 38 are each made from one of plastic, rubber, and metal.

The belt-loop plate 58 of the maintaining apparatus 38 has a pair of through slots 62.

The pair of through slots 62 of the belt-loop plate 58 of the maintaining apparatus 38 are disposed facing the through slots 56 of the inner proximal ends 52 of the pair of intermediate layers 34, respectively.

The elevation plate 60 of the maintaining apparatus 38 raises the belt-loop plate 58 of the maintaining apparatus 38 off of the outer-facing surface 40 of the inner layer 30 a sufficient amount to allow access to the pair of through slots 62 of the belt-loop plate 58 of the maintaining apparatus 38.

The maintaining apparatus 38 further includes a pair of straps 64.

The pair of straps 64 of the maintaining apparatus 38 have one portion of hook and loop pile fasteners (VELCRO®) 65 thereon.

Each strap 64 of the maintaining apparatus 38 is affixed, at one end thereof, to the through slot 56 of the inner proximal end 52 of an associated intermediate layer 34, then extends therefrom freely through an associated through slot 62 of the belt-loop plate 58 of the maintaining apparatus 38, and then extends back onto itself as a terminal portion 66.

The maintaining apparatus 38 further includes the outer layer 32 having a pair of access flaps 68.

The pair of access flaps 68 of the outer layer 32 are rectangular-shaped, are formed by being cut out of the outer layer 32 so as to leave a pair of through openings 70 thereunder in the outer layer 32 that the pair of access flaps 68 of the outer layer 32 selectively close, are disposed straddling the belt-loop plate 58 of the maintaining apparatus 38, and when open, allow access to the terminal portion 66 of an associated strap 64 of the maintaining apparatus 38.

Each access flap 68 of the outer layer 32 has an inner surface 72 that faces the terminal portion 66 of an associated strap 64 of the maintaining apparatus 38.

The maintaining apparatus 38 further includes a pair of mating portions of hook and loop pile fasteners (VELCRO®) 74.

Each mating portion of hook and loop pile fasteners (VELCRO®) 74 of the maintaining apparatus 38 is disposed on the inner surface 72 of an associated access flap 68 of the maintaining apparatus 38, and selectively mates with the one portion of hook and loop pile fasteners (VELCRO®) 65 of an associated strap 64 of the maintaining apparatus 38.

When the pair of intermediate layers 34 are axially positioned in the track 46 of the outer-facing surface 40 of said inner layer of the inner layer 30 for overlying the remaining end portions 36 of the length of the one of the front bumper cover 12 of the vehicle 14 and the rear bumper cover 16 of the vehicle 14, the terminal portions 66 of the pair of straps 64 of the maintaining apparatus 38 are pulled taunt and the pair of access flaps 68 of the maintaining apparatus 38 are closed causing the mating portions of hook and loop pile fasteners (VELCRO®) 74 of the maintaining apparatus 38 to engage the one portion of hook and loop pile fasteners (VELCRO®) 65 of the pair of straps 64 of the maintaining apparatus 38, respectively, and prevent the pair of straps 64 of the maintaining apparatus 38 from moving, thereby preventing the pair of intermediate layers 34 from moving so as to maintain the pair of intermediate layers 34 at the desired positions for facing, and overlying, the remaining end portions 36 of the length of the one of the front bumper cover 12 of the vehicle 14 and the rear bumper cover 16 of the vehicle 14.

Specific Configuration of the Attaching Apparatus 39

The specific configuration of the attaching apparatus 39 can best be seen in FIGS. 2, 5-8, and 9, and as such, will be discussed with reference thereto.

The attaching apparatus 39 includes an extended folding flap 76. The extended folding flap 76 of the attaching apparatus 39 is for overlying one of the front bumper cover top 22 of the front bumper cover 12 of the vehicle 14 and the rear bumper cover top 28 of the rear bumper cover 16 of the vehicle 14.

The extended folding flap 76 of the attaching apparatus 39 extends upwardly, outwardly, and centrally, from the inner layer 30, and has a pair of through slots 78.

The attaching apparatus 39 further includes a pair of bendable, rubber-coated, and metallic strips 80.

The pair of bendable, rubber-coated, and metallic strips 80 of the attaching apparatus 39 are made from aluminum, extend outwardly and axially from the outer distal ends 54 of the pair of intermediate layers 34, respectively, to a pair of terminal ends 82, respectively, and are for bending into one of the pair of front wheel wells 20 of the vehicle 14, respectively, and the pair of rear wheel wells 26 of the vehicle 14, respectively.

The pair of terminal ends 82 of the pair of bendable, rubber-coated, and metallic strips 80 of the attaching apparatus 39 have a pair of through bores 84, respectively.

The pair of through bores 84 of the pair of terminal ends 82 of the pair of bendable, rubber-coated, and metallic strips 80 of the attaching apparatus 39, respectively, receive a pair of screws 86, respectively. The pair of screws 86 of the attaching apparatus 39 are for screwing into the one of the pair of front wheel wells 20 of the vehicle 14, respectively, and the pair of rear wheel wells 26 of the vehicle 14, respectively, when necessary.

The attaching apparatus 39 further includes a pair of supports 88.

The pair of supports 88 of the attaching apparatus 39 are made from thick rubber, are disposed between the pair of bendable, rubber-coated, and metallic strips 80 of the attaching apparatus 39 and the pair of intermediate layers 34, respectively, and attach the pair of bendable, rubber-coated, and metallic strips 80 of the attaching apparatus 39, to the pair of intermediate layers 34, respectively.

The attaching apparatus 39 further includes a pair of straps 90.

The pair of straps 90 of the attaching apparatus 39 are length-adjustable, and extend from the pair of through slots 78 of the extended folding flap 76 of the attaching apparatus 39, respectively, to a pair of terminal portions 92, respectively.

The attaching apparatus 39 further includes a pair of angled belt loops 94 (FIG. 2) when the protector 10 is for protecting the front bumper cover 12 of the vehicle 14.

The pair of angled belt loops 94 of the attaching apparatus 39 are disposed along, and angle skewly outwardly, the pair of straps 90 of the attaching apparatus 39, respectively (FIG. 2).

The attaching apparatus 39 further includes a pair of flat hooks 96 when the protector 10 is for protecting the front bumper cover 12 of the vehicle 14. The pair of flat hooks 96 of the attaching apparatus 39 are for replaceably engaging the grille 18 of the vehicle 14.

The pair of flat hooks 96 of the attaching apparatus 39 are replaceably attached to the pair of terminal portions 92 of the pair of straps 90 of the attaching apparatus 39, respectively.

The attaching apparatus 39 further includes one portion of hook and loop pile fasteners 98 (FIG. 9) when the protector 10 is for protecting the rear bumper cover 16 of the vehicle 14.

The one portion of hook and loop pile fasteners 98 of the attaching apparatus 39 is disposed along the pair of terminal portions 92 of the pair of straps 90 of the attaching apparatus 39, and is for replaceably engaging the carpet 25 of the trunk 24 of the vehicle 14 because the pile of the carpet 25 of the trunk 24 of the vehicle 14 functions as mating portion of the hook and loop pile fasteners 98 of the attaching apparatus 39.

The attaching apparatus 39 further includes a tension rod 100 when the protector 10 is for protecting the rear bumper cover 16 of the vehicle 14.

The tension rod 100 of the attaching apparatus 39 is length adjustable by merely being twisted, is spring-loaded, is replaceably received by a pair of loops 102, respectively, formed by the pair of terminal portions 92 of the pair of straps 90 of the attaching apparatus 39, respectively, and has a pair of ends 104. The pair of ends 104 of the tension rod 100 of the attaching apparatus 39 are for snugging up against the pair of side walls 27 of the trunk 24 of the vehicle 14, respectively, and are made from rubber so as not to damage the pair of side walls 27 of the trunk 24 of the vehicle 14.

Impressions

It will be understood that each of the elements described above, or two or more together, may also find a useful application in other types of constructions differing from the types described above.

While the invention has been illustrated and described as embodiments of an adjustable length bumper guard, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A length-adjustable protector for overlying, and protecting, one of a front bumper cover of a vehicle having a length and a rear bumper cover of the vehicle having a length, and for self-adjusting to the length of the one of the front bumper cover of the vehicle and the rear bumper cover of the vehicle, wherein the vehicle further has a grille, a pair of front wheel wells, a front bumper cover top, a trunk with a carpet and a pair of side walls, a pair of rear wheel wheels, and a rear bumper cover top, said length-adjustable protector comprising:
   a) an inner layer;
   b) an outer layer; and
   c) a pair of intermediate layers;
   wherein said inner layer is for facing a central portion of the length of the one of the front bumper cover of the vehicle and the rear bumper cover of the vehicle;
   wherein said inner layer is for overlying the central portion of the length of the one of the front bumper cover of the vehicle and the rear bumper cover of the vehicle;
   wherein said outer layer over lies said inner layer; and
   wherein said pair of intermediate layers extend movably between said inner layer and said outer layer and are for facing, and overlying, remaining end portions of the length of the one of the front bumper cover of the vehicle and the rear bumper cover of the vehicle, and in doing so, self-adjusts to the length of the one of the front bumper cover of the vehicle and the rear bumper cover of the vehicle further comprising maintaining apparatus;
   wherein said maintaining apparatus maintains said pair of intermediate layers at desired positions for facing, and overlying, the remaining end portions of the length of the one of the front bumper cover of the vehicle and the rear bumper cover of the vehicle;
   wherein said inner layer is rectangular-shaped;
   wherein said inner layer is made from rubber;
   wherein said inner layer has an outer-facing surface;
   wherein said outer-facing surface of said inner layer has a pair of longitudinal borders;
   wherein said pair of longitudinal borders of said outer-facing surface of said inner layer are a pair of raised borders, respectively.

2. The length-adjustable protector of claim 1, wherein said pair of raised borders of said pair of longitudinal borders of said outer-facing surface of said inner layer form a track therebetween.

3. The length-adjustable protector of claim 2, wherein said track of said outer-facing surface of said inner layer have a pair of open ends.

4. The length-adjustable protector of claim 1, wherein said outer layer is rectangular-shaped.

5. The length-adjustable protector of claim 1, wherein said outer layer is made from rubber.

6. The length-adjustable protector of claim 1, wherein said outer layer has a size that is similar to that of said inner layer.

7. The length-adjustable protector of claim 1, wherein said outer layer has a shape that is similar to that of said inner layer.

8. The length-adjustable protector of claim 1, wherein said outer layer overlies said pair of raised borders of said pair of longitudinal borders of said outer-facing surface of said inner layer.

9. The length-adjustable protector of claim 1, wherein said outer layer contacts said pair of raised borders of said pair of longitudinal borders of said outer-facing surface of said inner layer.

10. The length-adjustable protector of claim 2, wherein said outer layer completes said track of said outer-facing surface of said inner layer.

11. The length-adjustable protector of claim 1, further comprising attaching means for replaceably attaching the length-adjustable protector to the vehicle.

12. The length-adjustable protector of claim 2, wherein said pair of intermediate layers extend from, and retract into, said track of said outer-facing surface of said inner layer.

13. The length-adjustable protector of claim 3, wherein said pair of intermediate layers extend from, and retract into, said track of said outer-facing surface of said inner layer via said pair of open ends of said track of said outer-facing surface of said inner layer, respectively.

14. The length-adjustable protector of claim 1, wherein each intermediate layer is flat.

15. The length-adjustable protector of claim 1, wherein each intermediate layer is made from rubber.

16. The length-adjustable protector of claim 2, wherein each intermediate layer has an inner proximal end.

17. The length-adjustable protector of claim 11, wherein each intermediate layer has an outer distal end.

18. The length-adjustable protector of claim 17, wherein said outer distal end of each intermediate layer is arcuately-convex-shaped to eliminate sharp edges thereat for preventing damage therefrom to the remaining end portions of the length of the one of the front bumper cover of the vehicle and the rear bumper cover of the vehicle.

19. The length-adjustable protector of claim 16, wherein said maintaining apparatus includes said inner proximal end of each intermediate layer having a through slot.

20. The length-adjustable protector of claim 19, wherein said maintaining apparatus includes a belt-loop plate.

21. The length-adjustable protector of claim 20, wherein said belt-loop plate of said maintaining apparatus is attached to said outer-facing surface of said inner layer.

22. The length-adjustable protector of claim 20, wherein said belt-loop plate of said maintaining apparatus is attached to said outer-facing surface of said inner layer via an elevation plate.

23. The length-adjustable protector of claim 20, wherein said belt-loop plate of said maintaining apparatus is disposed centrally on said outer-facing surface of said inner layer.

24. The length-adjustable protector of claim 20, wherein said belt-loop plate of said maintaining apparatus is made from plastic.

25. The length-adjustable protector of claim 20, wherein said belt-loop plate of said maintaining apparatus is made from rubber.

26. The length-adjustable protector of claim 20, wherein said belt-loop plate of said maintaining apparatus is made from metal.

27. The length-adjustable protector of claim 22, wherein said elevation plate of said maintaining apparatus is made from plastic.

28. The length-adjustable protector of claim 22, wherein said elevation plate of said maintaining apparatus is made from rubber.

29. The length-adjustable protector of claim 22, wherein said elevation plate of said maintaining apparatus is made from metal.

30. The length-adjustable protector of claim 22, wherein said belt-loop plate of said maintaining apparatus has a pair of through slots.

31. The length-adjustable protector of claim 30, wherein said pair of through slots of said belt-loop plate of said maintaining apparatus are disposed facing said through slots of said inner proximal ends of said pair of intermediate layers, respectively.

32. The length-adjustable protector of claim 30, wherein said elevation plate of said maintaining apparatus raises said belt-loop plate of said maintaining apparatus off of said outer-facing surface of said inner layer a sufficient amount to allow access to said pair of through slots of said belt-loop plate of said maintaining apparatus.

33. The length-adjustable protector of claim 30, wherein said maintaining apparatus includes a pair of straps.

34. The length-adjustable protector of claim 33, wherein each strap of said maintaining apparatus has one portion of hook and loop pile fasteners thereon.

35. The length-adjustable protector of claim 34, wherein each strap of said maintaining apparatus is affixed, at one end thereof, to said through slot of said inner proximal end of an associated intermediate layer, then extends therefrom freely through an associated through slot of said belt-loop plate of said maintaining apparatus, and then extends back onto itself as a terminal portion.

36. The length-adjustable protector of claim 35, wherein said maintaining apparatus includes said outer layer having a pair of access flaps.

37. The length-adjustable protector of claim 36, wherein said pair of access flaps of said outer layer are cut out of said outer layer.

38. The length-adjustable protector of claim 36, wherein said pair of access flaps of said outer layer are rectangular-shaped.

39. The length-adjustable protector of claim 36, wherein said pair of access flaps of said outer layer leave a pair of through openings thereunder, respectively, in said outer layer.

40. The length-adjustable protector of claim 39, wherein said pair of through openings in said outer layer are selectively closed by said pair of access flaps of said outer layer, respectively.

41. The length-adjustable protector of claim 36, wherein said pair of access flaps of said outer layer are disposed to straddle said belt-loop plate of said maintaining apparatus.

42. The length-adjustable protector of claim 36, wherein each access flap of said outer layer has an inner surface.

43. The length-adjustable protector of claim 42, wherein said inner surface of each access flap of said outer layer faces said terminal portion of an associated strap of said maintaining apparatus.

44. The length-adjustable protector of claim 42, wherein said maintaining apparatus includes a pair of mating portions of hook and loop pile fasteners.

45. The length-adjustable protector of claim 44, wherein each mating portion of hook and loop pile fasteners of said maintaining apparatus is disposed on said inner surface of an associated access flap of said maintaining apparatus.

46. The length-adjustable protector of claim 44, wherein each mating portion of hook and loop pile fasteners of said maintaining apparatus selectively mates with said one portion of hook and loop pile fasteners of an associated strap of said maintaining apparatus.

47. The length-adjustable protector of claim 44, wherein when said pair of intermediate layers are axially positioned in said track of said outer-facing surface of said inner layer for overlying the remaining end portions of the length of the one of the front bumper cover of the vehicle and the rear bumper cover of the vehicle, said terminal portions of said pair of straps of said maintaining apparatus are pulled taunt and said pair of access flaps of said maintaining apparatus are closed causing said mating portions of hook and loop pile fasteners of said maintaining apparatus to engage said one portion of hook and loop pile fasteners of said pair of straps of said maintaining apparatus, respectively, and prevent said pair of straps of said maintaining apparatus from moving, thereby preventing said pair of intermediate layers from moving so as to maintain said pair of intermediate layers at said desired positions for facing, and overlying, the remaining end portions of the length of the one of the front bumper cover of the vehicle and the rear bumper cover of the vehicle.

48. The length-adjustable protector of claim 11, wherein said attaching means includes an extended folding flap; and
    wherein said extended folding flap of said attaching means is for overlying one of the front bumper cover top of the front bumper cover of the vehicle and the rear bumper cover top of the rear bumper cover of the vehicle.

49. The length-adjustable protector of claim 48, wherein said extended folding flap of said attaching means extends upwardly from said inner layer.

50. The length-adjustable protector of claim 48, wherein said extended folding flap of said attaching means extends outwardly from said inner layer.

51. The length-adjustable protector of claim 48, wherein said extended folding flap of said attaching means extends centrally from said inner layer.

52. The length-adjustable protector of claim 48, wherein said extended folding flap of said attaching means has a pair of through slots.

53. The length-adjustable protector of claim 17, wherein said attaching means includes a pair of strips; and
    wherein said pair of strips of said attaching means are for bending into one of the pair of front wheel wells of the vehicle, respectively, and the pair of rear wheel wells of the vehicle, respectively.

54. The length-adjustable protector of claim 53, wherein said pair of strips of said attaching means are bendable.

55. The length-adjustable protector of claim 53, wherein said pair of strips of said attaching means are rubber-coated.

56. The length-adjustable protector of claim 53, wherein said pair of strips of said attaching means are metallic.

57. The length-adjustable protector of claim 53, wherein said pair of strips of said attaching means are made from aluminum.

58. The length-adjustable protector of claim 53, wherein said pair of strips of said attaching means extend outwardly from said outer distal ends of said pair of intermediate layers, respectively, to a pair of terminal ends, respectively.

59. The length-adjustable protector of claim 53, wherein said pair of strips of said attaching means extend axially from said outer distal ends of said pair of intermediate layers, respectively, to a pair of terminal ends, respectively.

60. The length-adjustable protector of claim 59, wherein said pair of terminal ends of said pair of strips of said attaching means have a pair of through bores, respectively.

61. The length-adjustable protector of claim 60, wherein said pair of through bores of said pair of terminal ends of said pair of strips of said attaching means, respectively, receive a pair of screws, respectively; and
    wherein said pair of screws of said attaching means are for screwing into the one of the pair of front wheel wells of the vehicle, respectively, and the pair of rear wheel wells of the vehicle, respectively, when necessary.

62. The length-adjustable protector of claim 53, wherein said attaching means includes a pair of supports.

63. The length-adjustable protector of claim 62, wherein said pair of supports of said attaching means are made from thick rubber.

64. The length-adjustable protector of claim 62, wherein said pair of supports of said attaching means are disposed between said pair of strips of said attaching means and said pair of intermediate layers.

65. The length-adjustable protector of claim 62, wherein said pair of supports of said attaching means attach said pair of strips of said attaching means to said pair of intermediate layers.

66. The length-adjustable protector of claim 52, wherein said attaching means includes a pair of straps.

67. The length-adjustable protector of claim 66, wherein said pair of straps of said attaching means are length-adjustable.

68. The length-adjustable protector of claim 66, wherein said pair of straps of said attaching means extend from said pair of through slots of said extended folding flap of said attaching means, respectively.

69. The length-adjustable protector of claim 66, wherein said pair of straps of said attaching means extend from said pair of through slots of said extended folding flap of said attaching means, respectively, to a pair of terminal portions, respectively.

70. The length-adjustable protector of claim 66, wherein said attaching means includes a pair of angled belt loops when said length-adjustable protector is for protecting the front bumper cover of the vehicle.

71. The length-adjustable protector of claim 70, wherein said pair of angled belt loops of said attaching means are disposed along said pair of straps of said attaching means, respectively.

72. The length-adjustable protector of claim 70, wherein said pair of angled belt loops of said attaching means angle said pair of straps of said attaching means, respectively, scala outwardly.

73. The length-adjustable protector of claim 69, wherein said attaching means includes a pair of flat hooks when said length-adjustable protector is for protecting the front bumper cover of the vehicle; and wherein said pair of flat hooks of said attaching means are for replaceably engaging the grille of the vehicle.

74. The length-adjustable protector of claim 73, wherein said pair of flat hooks of said attaching means are replaceably attached to said pair of terminal portions of said pair of straps of said attaching means, respectively.

75. The length-adjustable protector of claim 69, wherein said attaching means includes one portion of hook and loop pile fasteners when said length-adjustable protector is for protecting the rear bumper cover of the vehicle; and wherein said one portion of hook and loop pile fasteners of said attaching means is for replaceably engaging the carpet of the trunk of the vehicle.

76. The length-adjustable protector of claim 75, wherein said one portion of hook and loop pile fasteners of said attaching means is disposed along said pair of terminal portions of said pair of straps of said attaching means.

77. The length-adjustable protector of claim 69, wherein said attaching means includes a tension rod when said protector is for protecting the rear bumper cover of the vehicle.

78. The length-adjustable protector of claim 77, wherein said tension rod of said attaching means is length adjustable by merely being twisted.

79. The length-adjustable protector of claim 77, wherein said tension rod of said attaching means is spring-loaded.

80. The length-adjustable protector of claim 77, wherein said tension rod of said attaching means is replaceably received by a pair of loops formed by said pair of terminal portions of said pair of straps of said attaching means.

81. The length-adjustable protector of claim 77, wherein said tension rod of said attaching means has a pair of ends; and wherein said pair of ends of said tension rod of said attaching means are for snugging up against the pair of side walls of the trunk of the vehicle, respectively.

82. The length-adjustable protector of claim 81, wherein said pair of ends of said tension rod of said attaching means are made from rubber so as not to damage the pair of side walls of the trunk of the vehicle.

\* \* \* \* \*